United States Patent [19]

Mote, Jr.

[11] Patent Number: 5,666,494

[45] Date of Patent: Sep. 9, 1997

[54] QUEUE MANAGEMENT MECHANISM WHICH ALLOWS ENTRIES TO BE PROCESSED IN ANY ORDER

[75] Inventor: L. Randall Mote, Jr., Laguna Hills, Calif.

[73] Assignee: Samsung Electronics Co., Ltd., Seoul, Rep. of Korea

[21] Appl. No.: 414,948

[22] Filed: Mar. 31, 1995

[51] Int. Cl.$^6$ ............... G06F 13/14; G06F 12/00; G11C 8/00
[52] U.S. Cl. ............... 711/167; 711/104; 711/105; 711/158; 395/877
[58] Field of Search ............... 395/481, 483, 395/484, 485, 494, 427, 432, 431, 436, 437, 459, 606, 250; 365/189.01, 221, 230.01, 230.03, 235, 238.5

[56] References Cited

U.S. PATENT DOCUMENTS

| | | | |
|---|---|---|---|
| 4,181,974 | 1/1980 | Lemay et al. | 395/200.01 |
| 4,429,375 | 1/1984 | Kobayashi et al. | 365/240 |
| 4,538,226 | 8/1985 | Hori | 395/250 |
| 4,926,385 | 5/1990 | Fujishima et al. | 365/230.03 |
| 4,959,771 | 9/1990 | Ardini, Jr. et al. | 395/250 |
| 5,022,004 | 6/1991 | Kurtze et al. | 365/189.07 |
| 5,023,776 | 6/1991 | Gregor | 395/449 |
| 5,034,917 | 7/1991 | Bland et al. | 395/494 |
| 5,042,007 | 8/1991 | D'Luna | 365/78 |
| 5,072,420 | 12/1991 | Conley et al. | 395/877 |
| 5,191,649 | 3/1993 | Cadambi et al. | 395/200.05 |
| 5,193,167 | 3/1993 | Sites et al. | 395/490 |
| 5,206,834 | 4/1993 | Okitaka et al. | 365/239 |
| 5,226,139 | 7/1993 | Fujishima et al. | 395/403 |
| 5,247,355 | 9/1993 | Fredriksen | 348/416 |
| 5,247,643 | 9/1993 | Shottan | 395/470 |
| 5,263,144 | 11/1993 | Zurawski et al. | 395/448 |
| 5,265,236 | 11/1993 | Mehring et al. | 395/413 |
| 5,278,967 | 1/1994 | Curran | 395/405 |
| 5,289,584 | 2/1994 | Thome et al. | 395/436 |
| 5,325,499 | 6/1994 | Kummer et al. | 395/470 |
| 5,379,379 | 1/1995 | Becker et al. | 395/250 |
| 5,388,247 | 2/1995 | Goodwin et al. | 395/470 |
| 5,465,336 | 11/1995 | Imai et al. | 395/392 |
| 5,479,635 | 12/1995 | Kametani | 395/405 |
| 5,485,589 | 1/1996 | Kocis et al. | 395/421.03 |
| 5,487,049 | 1/1996 | Hang | 365/221 |
| 5,524,220 | 6/1996 | Verma et al. | 395/383 |

FOREIGN PATENT DOCUMENTS

| | | |
|---|---|---|
| 9411828 | 5/1994 | WIPO . |
| 9412935 | 6/1994 | WIPO . |

OTHER PUBLICATIONS

"Fast Data Access of DRAMs by Utilizing a Queued Memory Command Buffer", IBM Technical Disclosure Bulletin, vol. 35, No. 7, pp. 63–66. Dec. 1992.

Primary Examiner—Tod R. Swann
Assistant Examiner—Conley B. King, Jr.
Attorney, Agent, or Firm—Knobbe, Martens, Olson, & Bear, LLP

[57] ABSTRACT

A memory subsystem includes a posted write buffer for dynamic random access memories (DRAMs). The posted write buffer includes read around logic to enable read accesses to be processed in advance of posted writes. Data are transferred from the posted write buffer to the DRAMs on a general first-in/first out basis; however, in order to take advantage of page mode operation, posted writes having the same row address as a current memory access are given priority over other posted writes such that the posted writes may be written out of order. In addition, comparisons are made between addresses of incoming read accesses and addresses of posted writes in order to expedite the transfer of posted writes having the same row addresses to memory in order to service the incoming read accesses on a timely basis. An improved write access buffer permits posted writes to be transferred to the DRAMs out of order without losing track of the skipped posted writes.

2 Claims, 13 Drawing Sheets

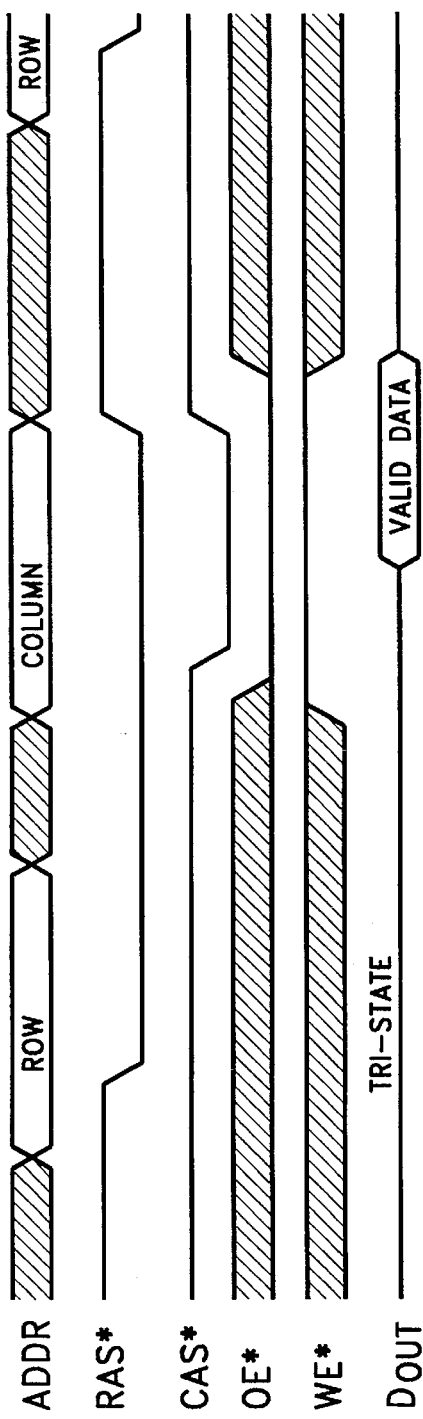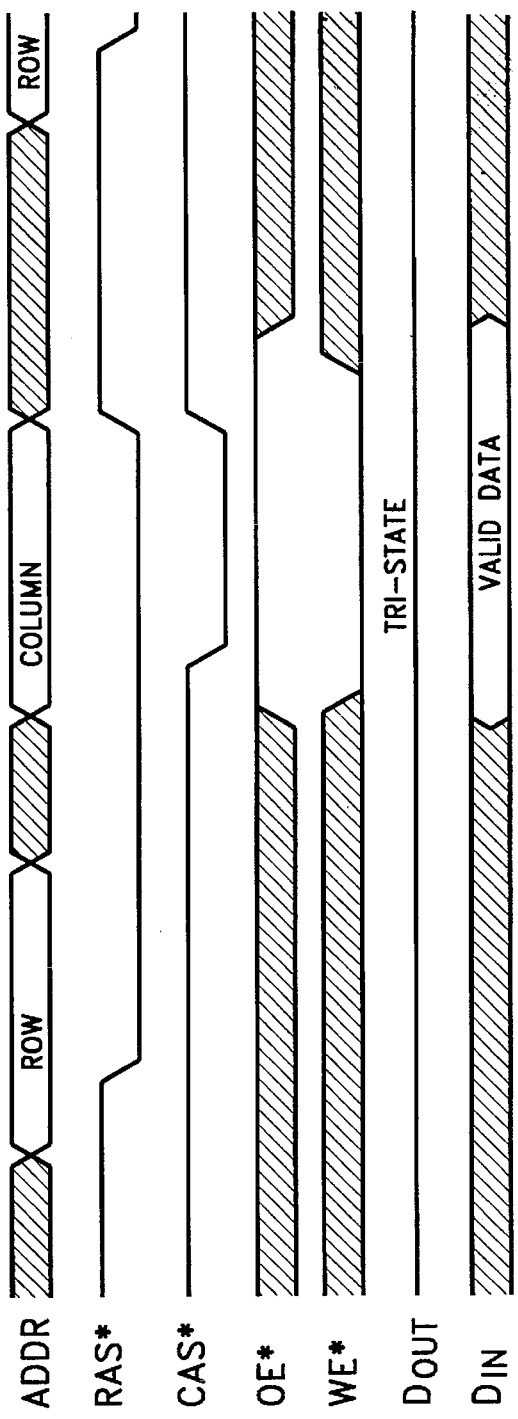
FIG. 3 (PRIOR ART)
FIG. 4 (PRIOR ART)

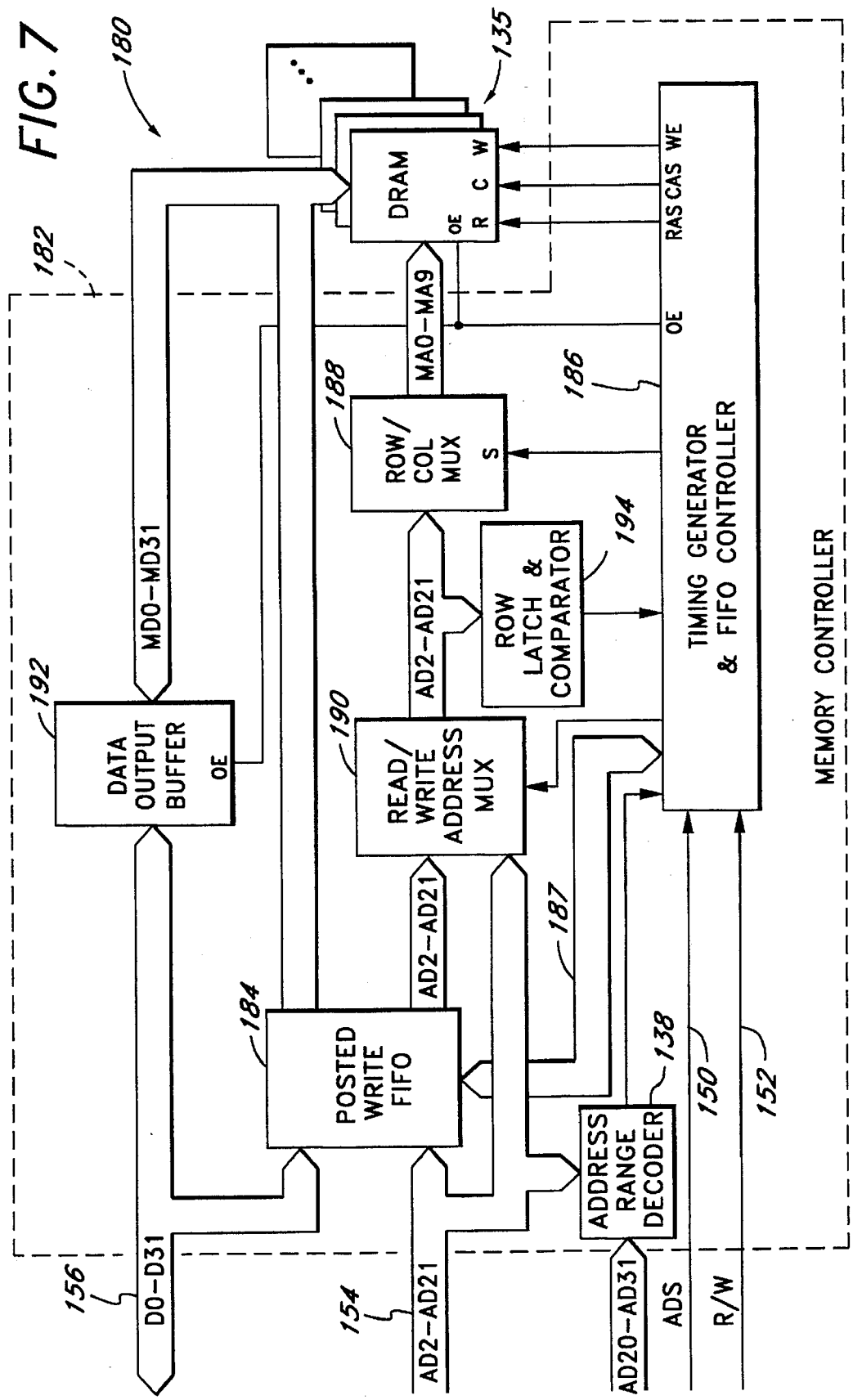

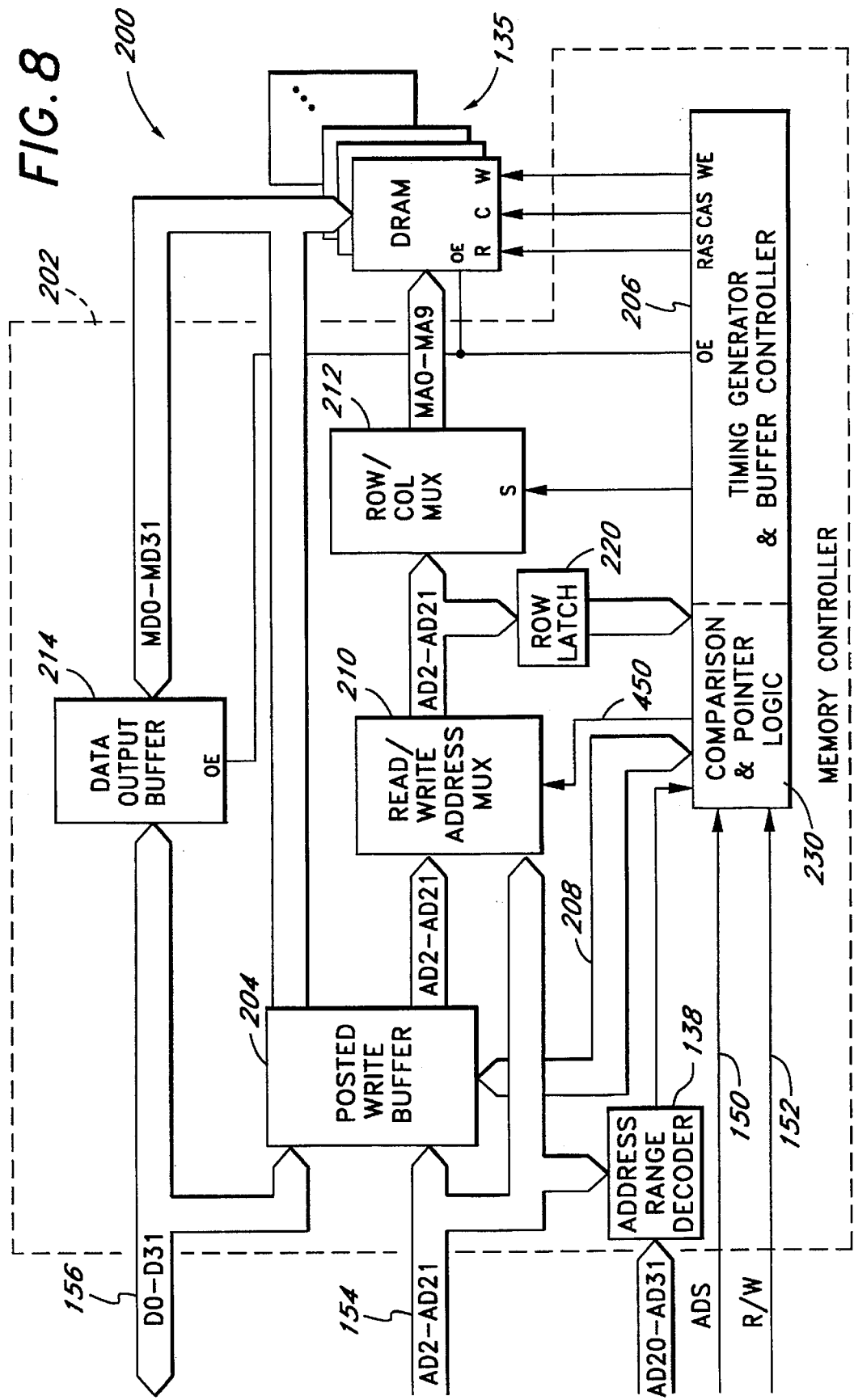

| READ ROW | WRITE ROW | ACCESS |
|---|---|---|
| NEW | EMPTY | READ NEW |
| NEW | NEW (DIF) | READ NEW |
| NEW | NEW (SAME) | WRITE NEW |
| NEW | CURRENT | WRITE CURRENT |
| CURRENT | EMPTY | READ CURRENT |
| CURRENT | NEW | READ CURRENT |
| CURRENT | CURRENT | WRITE CURRENT |

- 301
- 302
- 303
- 304
- 305
- 306
- 307

NEXT ACCESS SELECTION

| READ ROW | WRITE ROW | ACCESS |
|---|---|---|
| NEW | EMPTY | READ NEW |
| NEW | NEW (DIF) | READ NEW |
| NEW | NEW (SAME) | WRITE NEW |
| NEW | CURRENT | WRITE CURRENT |
| CURRENT | EMPTY | READ CURRENT |
| CURRENT | NEW | READ CURRENT |
| CURRENT | CURRENT (DIF) | READ CURRENT |
| CURRENT | CURRENT (SAME) | WRITE CURRENT |

- 311
- 312
- 313
- 314
- 315
- 316
- 317
- 318

ALTERNATIVE NEXT ACCESS SELECTION
WITH COLUMN BIT(S)

| ENTRY RDY & PAGE HIT? | ENTRY RDY & PAGE MISS? | NEXT ACCESS |
|---|---|---|
| NO | NO | NO WRITE ACCESS — 321 |
| NO | YES | WRITE OLDEST ENTRY — 322 |
| YES | NO | WRITE OLDEST CURRENT ROW ENTRY — 323 |
| YES | YES | WRITE OLDEST CURRENT ROW ENTRY — 324 |

WRITE ACCESS SELECTION

*FIG. 11*

| LOCATION NO. | ENTRY DATA | ENTRY-READY | |
|---|---|---|---|
| 3 | PROCESSED ENTRY | 0 | ← INPUT POINTER |
| 2 | QUEUED ENTRY | 1 | |
| 1 | QUEUED ENTRY | 1 | ← OUTPUT POINTER<br>← BASE ENTRY POINTER |
| 0 | PROCESSED ENTRY | 0 | |

QUEUE MANAGEMENT MECHANISM WHICH ALLOWS ENTRIES TO BE PROCESSED IN ANY ORDER

BACKGROUND OF THE INVENTION

1. Field of the Invention

The present invention relates to memory control circuits for dynamic random access memories in a microprocessor-based computer system which can post write commands and continue processing without waiting for completion of such write commands.

2. Description of the Related Art

Dynamic random access memories (DRAMs) are used as the main memories of most microprocessor-based computer systems because DRAMs provide a reasonable compromise between storage capacity, access time, and cost. As is well known in the art, DRAMs are controlled by first applying a row address to one or more DRAMs; strobing the row address into the DRAMs by activating a row address strobe (RAS) signal which precharges the selected row; waiting for at least a minimum duration of a row access time; applying a column address to the DRAMs; and then strobing the column address into the DRAMs by activating a column address strobe (CAS) signal to select the data from one column of the accessed row.

Most presently available DRAMs operate in the "page mode" wherein data stored in the same row (i.e., page) but in a different column can be accessed by simply changing the column address. It is not necessary to reapply the row address to the DRAM because all the data in the row is already available to be read or changed. Because of the speed advantage provided by this page mode feature, it is very advantageous to access many storage locations in a single row before changing the row address. For example, when large blocks of data are transferred to or from a DRAM-based memory system, the sequential addresses typically access most or all of the columns in a particular row before the row address is changed.

In a typical microprocessor-based computer system, data are read from and written to a memory system at random addresses, particularly when instructions and data are stored in the same memory system or when operand data are read from one range of memory locations and data results are stored in a different range of address locations. Thus, the advantages of page mode operation often cannot be utilized because of the "random" accessing of the memory system.

One feature of more recent microprocessors is to permit posted writes. That is, a microprocessor may output data to be stored in a memory location. The address and data are temporarily stored in a buffer in a memory controller, and the microprocessor is permitted to continue with its next operation without waiting for the completion of the write operation to the selected memory location. Sufficient buffering can be provided to permit multiple write operations to be posted by the microprocessor before it has to wait for completion of the write operations.

Systems utilizing the posted write feature include logic to compare read addresses with write addresses to make sure that a subsequent read from the memory system is not directed to a memory address which has posted write data which have not already been written. If the read address corresponds to a posted write address, the memory controller may wait to respond to the read request until the posted write operation is completed, or, in the alternative, the memory controller may respond to the read request by transmitting data directly from the posted write buffer. If the read address is different from the addresses of all the posted writes, the memory controller may include "read-around" logic to enable the memory controller to respond to the read access to a different location before completing the posted write operations.

Known memory controllers which implement posted write operations operate on a first-in, first out basis. That is, the posted writes are written to memory in the same order in which the posted writes are received by the memory controller. If sequential posted write operations are directed to addresses in different pages of the DRAMs, the memory system incurs the time penalty caused by the row access time. Even if two posted writes in the buffer are directed to the same memory page, a conventional memory controller does not write the two posted writes in sequence if a third posted write directed to a different page is posted between them. Furthermore, if the memory controller permits read-around operations to occur, the read access may be from a different page than a previous posted write or a subsequent posted write. This will again cause the row access time penalty to be incurred. If the microprocessor cannot post further writes or has to wait for read data when the memory controller slows down because of frequent page switching, the overall system performance will be degraded.

Thus, it can be seen that many of the advantages of memory controllers having post write capability and read-around capability are offset by the time penalty caused by changing the row address between memory accesses.

SUMMARY OF THE INVENTION

The memory controller of the present invention is specifically designed to reduce the memory access time for read and write cycle accesses in a memory system with page mode accesses by rearranging the processing order of the read and write cycle access requests. More specifically, the memory controller enables the rearrangement of the read and write cycle access requests such that all of the read and write accesses which require access to the current page (which is translated into a row address in a page mode accessing scheme) are performed before the read and write cycle accesses requests which require access to a different page (row). In alternative embodiments, all reads are performed before any writes. In such embodiments, reads to a current page are performed before reads to a new page, and writes to a current page are performed before writes to a new page.

As discussed above, in a typical addressing scheme, the memory controller has to wait between memory accesses which require a change in the row address for a specified period of time for the new row of the DRAM to become fully charged before the new row address can be strobed into the DRAM. This delay in the presentation of the new row address is referred to as the row address precharge time. Advantageously, the memory controller of the present invention rearranges the read and write cycle accesses such that multiple accesses for the same page are performed together. Thus, the memory controller of the present invention reduces the overall memory access time by eliminating the row address precharge time between each of the cycle accesses for the same row that would have occurred had the memory cycle requests been processed in their original order.

One aspect of the present invention is a memory controller which controls a dynamic random access memory (DRAM) system which receives a plurality of write access requests having respective addresses and associated data to be written to the DRAM system at the addresses. Each of the write addresses has a row address portion and a column address portion. The memory controller comprises a buffer having a plurality of locations which temporarily store the write addresses and associated data for each of the write access requests until the data can be written to the DRAM system. The stored addresses and data are maintained in the buffer in an order corresponding to an order in which the write access requests are received. An access sequence control circuit selects address and data associated with one of the plurality of write access requests as a next access to the DRAM system. The access sequence control circuit comprises a comparator which compares the row address portion of each of the stored addresses with the row address portion of a current access and identifies write access requests having respective row address portions identical to the row address portion of the current access. The access sequence circuit further includes an access selector circuit responsive to the comparator. The access selector circuit selects one of the identified write access requests as a next access to the DRAM system before selecting a non-identified write access request having a row address portion different from the row address portion of the current access. The selection of the one of the identified write access request is made even if the non-identified write access request was made prior to the identified write access request.

The memory controller can also receive a read access request having a read address. The read address has a row address portion and a column address portion. The comparator compares the row address portion of the read address and identifies whether the row address portion of the read address is directed to the row address portion of the current access. The access selector circuit selects the read access request as a next access prior to selecting the non-identified write access request as a next access. Also preferably, the comparator further comprises logic which compares at least a portion of the column address portion of the read address with a corresponding portion of the column address portions of the plurality of write addresses in the buffer. The address selector circuit preferably selects the read access request before any write access request when the row address portion of the read address is identical to the row address portion of the current access and the portion of the column address portion of the read address is different from the corresponding portions of the column address portions of the identified write access requests.

Another aspect of the present invention is a method for controlling access to a dynamic random access memory (DRAM) system having a plurality of memory storage locations. The DRAM system is accessed by applying a row address to the DRAM system and then applying a column address to the DRAM system. The DRAM system provides access to a plurality of locations having the same row address by changing only the column address between accesses. The method comprises the step of storing an address and associated data for each of a plurality of write access requests in a buffer. Each address of the plurality of access requests comprises a row address portion and a column address portion. Each address and associated data are stored in an order in which the memory controller receives the access requests. The method includes the further steps of performing a first access to the DRAM system at a first row address and a first column address; and comparing the first row address portion with the row address portion of each access request stored in the buffer. When at least one access request in the buffer has a row address portion identical to the row address portion of the first access, the method selects as a second access to the DRAM system an earliest received access request of the at least one access request having a row address portion identical to the row address portion of the first access. The access request having an identical row address portion is selected before earlier access requests having non-identical row address portions. When no access request in the buffer has a row address portion identical to the row address portion of the first access, the method selects an earliest received access request in the buffer as the second access. With respect to this aspect of the invention, the method preferably includes the further steps of comparing a row address portion and at least one bit of a column address portion of a read access request to row address portions and a corresponding bit of column address portions of the plurality of write access requests in the buffer. When the row address portion of the read access is identical to a row address portion of at least one of the write access requests, the method performs the read access prior to the write accesses having an identical row address portion when the corresponding bits of the column address portions are different. Otherwise, the method performs a write access prior to the read access when the at least one bit of the column address portion of the read access is identical to the at least one bit of the column address portion of one of the write accesses.

Another aspect of the present invention is a method of selecting a next access in a dynamic random access memory (DRAM) system having posted write requests to the DRAM system when at least one of the posted writes has an address directed to a storage location having a row address identical to a row address of a current access to the DRAM system and at least one of the posted writes has an address directed to a storage location having a row address different from the row address of the current access. The method comprises the steps of selecting an earliest received write access having an identical row address as a next access prior to selecting any write access having a different row address; and when no write access has an identical row address, selecting an earliest write access having a different row address as a next access.

A still further aspect of the present invention is a buffer circuit which permits data to be received in a sequential order and stored in a plurality of locations in the buffer circuit and which permits the data to be output from the buffer circuit non-sequentially. The buffer circuit comprises an input pointer which identifies a next empty one of the locations to receive a next data input; an output pointer which identifies a next full one of the locations as a source of a next output; and a pointer control circuit which controls the input pointer and the output pointer independently, the pointer control circuit including a priority scheduler responsive to a predetermined characteristic of the data to select one of the full ones of the locations as the source of the next output. Preferably, the data includes addresses which identify storage locations in a dynamic random access memory (DRAM) system, and the predetermined characteristic of the data comprises a result of a comparison as to whether row address portions of the addresses are identical to row address portions of a currently accessed storage location in the DRAM system.

BRIEF DESCRIPTION OF THE DRAWINGS

FIG. 3 illustrates a timing diagram of a read access in an exemplary DRAM system.

FIG. 4 illustrates a timing diagram of a write access in an exemplary DRAM system.

FIG. 7 illustrates a block diagram of a memory subsystem which incorporates a posted write FIFO buffer.

FIG. 8 illustrates a block diagram of a memory subsystem which incorporates a posted write buffer and memory controller in accordance with the present invention.

FIG. 9 is a table illustrating one embodiment of the row selections of the next access address for the combinations of row address portions of read access requests and posted writes in comparison with the current row address.

FIG. 10 is a table illustrating an alternative embodiment of the selections of the next access address for the combinations of row address portions of read access requests and posted writes in comparison with the current row address.

FIG. 11 is a table illustrating the selections of the next write access address for the combinations of posted writes which may include page (i.e., row) hits; page misses; or page hits and page misses.

FIG. 13 illustrates a high level functional representation of the posted write buffer of FIGS. 8 and 12.

DETAILED DESCRIPTION OF THE PREFERRED EMBODIMENT

Figure 1:
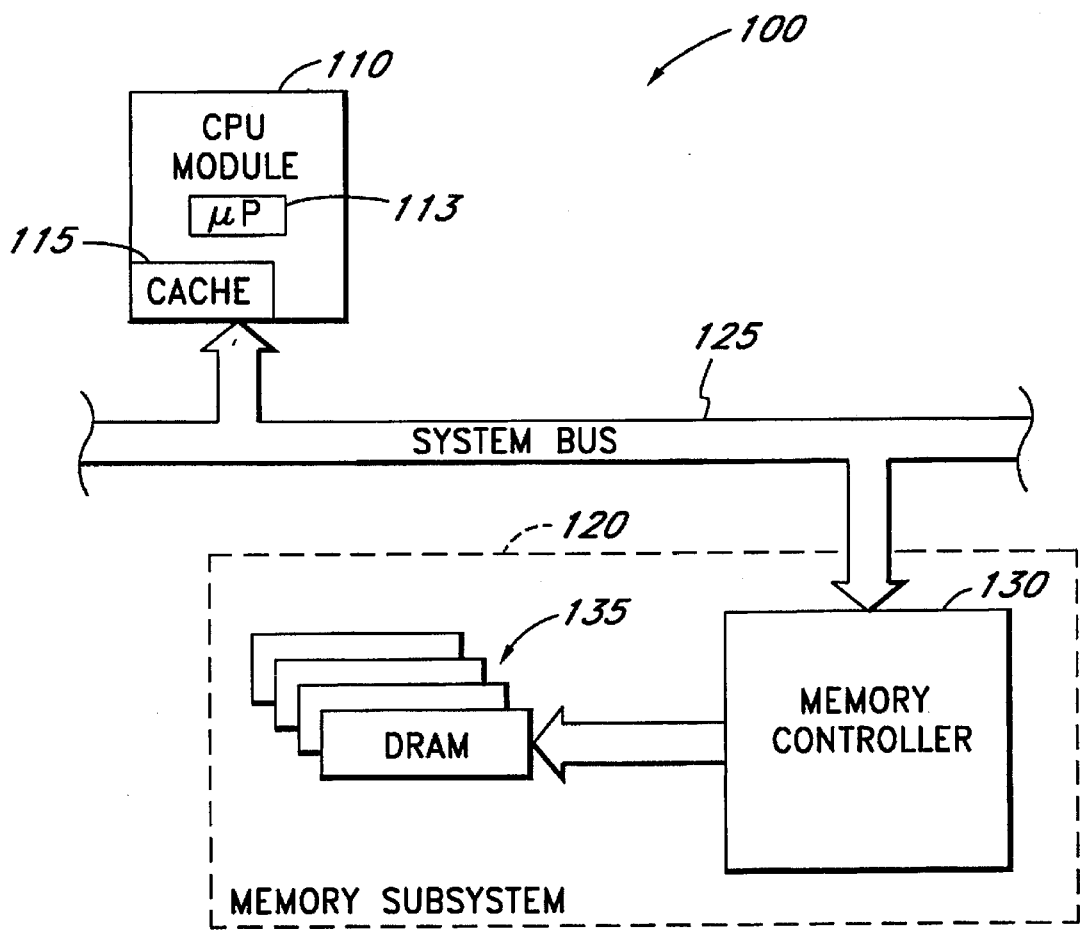
FIG. 1 is a simplified block diagram of a computer system which includes a memory subsystem.

FIG. 1 depicts portions of an exemplary computing system 100 pertinent to the present invention. The computing system 100 includes a CPU module 110 which includes a microprocessor 113 and a cache memory 115, for example. As is well understood in the art, the CPU module 110 includes other conventional circuitry such as a bus controller, a bus interface, and the like, which are not shown here. The CPU module 110 communicates with a memory subsystem 120 via a system bus 125. The memory subsystem 120 additionally comprises a memory controller 130 and a plurality of dynamic random access memories (DRAMs) 135. A typical computer system 100 includes other components, such as an I/O interface, disk drives and disk drive controllers, video displays, keyboards and the like, which are also not shown in FIG. 1 in order to emphasize the present invention. It should be further understood that other such components may access the memory subsystem 120 using direct memory access (DMA) transactions via the system bus.

The system bus 125 in FIG. 1 is illustrated as a composite bus. One skilled in the art will appreciate that the system bus 125 includes a plurality of address lines, a plurality of data lines and a plurality of control lines. The control lines may include, for example, an IO/MEM line which selects between transfers between the CPU module 110 and I/O devices (not shown) or transfers between the CPU module 110 and the memory subsystem 120; and a read/write line which selects between transfers from the memory subsystem 120 to the CPU module 110 (read) or from the CPU module to the memory subsystem 120 (write). It may also include byte select lines which determine which bytes of data in a multiple byte word to transfer; and one or more cycle initiation signals which are activated by the microprocessor 113 in the CPU module 110 to start an access cycle. For example, in an Intel® microprocessor, such as the 80486, the Pentium, or the like, the microprocessor activates an address strobe signal (ADS) to initiate an access cycle.

The memory subsystem 120 responds to the respective signals on the address, data and control lines to begin an access cycle, and, if a read access is selected by the microprocessor 113, data are transferred from a memory location determined by the address signals and the byte select signals to the microprocessor 113 via the data lines of the system bus 125. If a write access is selected by the microprocessor 113, data are transferred from the microprocessor 113 to the memory subsystem 120 via the data lines.

Figure 2:
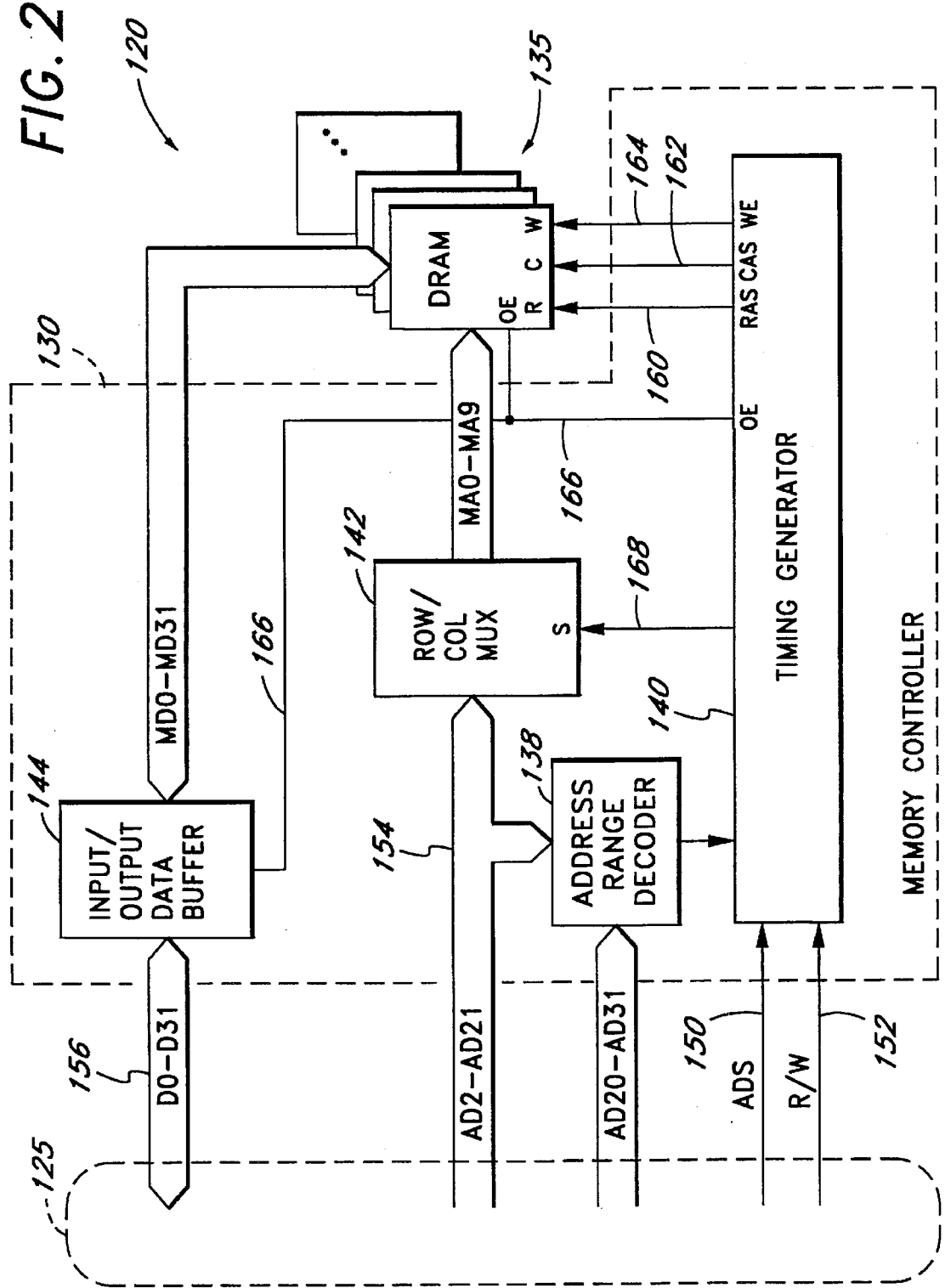
FIG. 2 is a simplified block diagram of the memory subsystem of FIG. 1.

FIG. 2 is a simplified block diagram of an exemplary memory subsystem 120 to illustrate the basic operation of the DRAMs 135. FIGS. 3 and 4 illustrates exemplary timing diagrams for a read access (FIG. 3) and a write access (FIG. 4) to the DRAMs. As illustrated, the memory controller 130 comprises an address range decoder 138, a timing generator 140, a row/column address multiplexer (MUX) 142 and a bidirectional data buffer 144. The memory controller 130 receives a plurality of address bits from the system bus 125 on a plurality of address lines 154, which for the purposes of this illustration are the address bits AD2 through AD31. Byte select lines are used by the memory controller in lieu of address bits AD0 and AD1 to select particular bytes of an 4-byte memory word to be accessed. In some systems, a memory word may have a larger number of bytes, and address bits AD2 or higher may be replaced by additional byte select lines to select between the larger number of bytes. In the embodiment described herein, address bits AD20-AD31 are used to select a particular subsystem to respond to an access on the system bus 135, such as, for example, the memory subsystem 120. Further, in the described embodiment, the address bits AD2-AD21 are used to select a particular storage location within the memory subsystem 120. It should be further understood that the allocation of the address bits AD0-AD31 to the control of the memory subsystem 120 will vary in accordance with the storage capacity and selected address range of the memory subsystem 120.

The address lines 154 are applied to the row/column address multiplexer 142. It will be appreciated by a person skilled in the art that an address normalization circuit (not shown) may be advantageously included in the memory subsystem 120 to normalize the addresses before the addresses are applied to the row/column address multiplexer 142. In exemplary DOS-based systems using the Intel® family of processors, the address space includes a number of "holes" caused by allocation of portions of the address range to video RAM, for example. These addresses are not directly addressed by the operating system as memory locations. Because the physical memory locations corresponding to these "holes" would not otherwise be used, an address normalization circuit translates logical addresses above the beginning of the holes to redirect the accesses to physical addresses corresponding to the "hole" locations. Such address normalization circuits are well known in the art and are not shown in FIGS. 2, 7 and 8 and are not described herein.

The timing generator 140 is responsive to control signals from the system bus 125 to generate appropriate access signals to the DRAMs 135. The address range decoder 138 decodes an address (comprising the address bits AD2–AD31) applied to the memory controller 130 and determines whether the applied address is within an address range allocated to the memory subsystem 120. The address range decoder 138 provides an active output signal to the timing generator 140 when the applied address is within such an address range. When an address strobe (ADS) signal on a line 150 is activated while the output of the address range decoder 138 is active, the timing generator 140 initiates an access to the DRAMs 135. If a R/W signal on a read/write line 152 is selected for a read access, the access will be initiated as a read access. Similarly, when the R/W signal is selected for a write access, the timing generator initiates a write access to the DRAMs 135.

The memory controller 130 further receives a plurality of data signals (D0–D31) on corresponding plurality of data lines 156. The exemplary system described herein is a 32-bit system. It should be understood that the following description would apply to systems having a larger number of bits per data word.

The timing generator 140 generates a row address strobe (RAS*) signal on a line 160, a column address strobe (CAS*) signal on a line 162, a write enable (WE*) signal on a line 164, an output enable (OE*) signal on a line 166, and a multiplexer select signal (S) on a line 168. (As used herein, an asterisk (*) after a signal name indicates an active low signal.) Multiple RAS* and CAS* signals may be provided to multiple banks of DRAMs such that only certain ones of the DRAMs are controlled by each RAS* and CAS* signal.

The operation of the exemplary memory subsystem 120 will be briefly described in connection with the timing diagrams in FIGS. 3 and 4. One familiar with DRAMs will understand that DRAM circuits typically have only half the address lines needed to fully address the memory locations in each circuit. For example, in order to address a 1 Megabit DRAM having 1,048,576 memory locations, 20 address bits are required; however, because of pin limitations and because of the operational characteristics of DRAMs, only 10 address pins are provided. The 20 address bits needed to fully address the DRAM are multiplexed to the DRAM, 10 address bits at a time. In particular, the multiplexer select signal (S) is first applied to the row/column address multiplexer 142 at a first logic level to apply a first 10 bits of the address from the system bus 125 as a row address as illustrated by ROW portion of the address (ADDR) signal in FIG. 3. Historically, the most significant bits of the address bits are applied as the row address, however, other combinations of address bits with a portion from the most significant bits and a portion from the least significant bits can also be used. See, for example, U.S. Pat. No. 5,247,643, the teachings of which are incorporated by reference herein. After selecting the address bits for the row address, the timing generator 140 activates the RAS* signal, as illustrated in FIG. 3. After a suitable delay determined by the particular characteristics of the DRAMs 135, the timing generator 140 switches the level on the select line 168 to cause the row/column address multiplexer 142 to apply the remaining address bits as the column address bits as illustrated by the COLUMN portion of the ADDR signal in FIG. 3. The timing generator 140 activates the CAS* signal to cause the column address to be strobed into the DRAMs 135. Because this is a read access, the WE* signal on the line 164 is inactive and the OE* signal on the line 166 is active so that valid data is output from the DRAMs after a short delay determined by the column address access time. The buffer 144 is also controlled by the OE* signal to transmit the data output from the DRAMs 135 to the data lines 156 of the system bus 125. (In some systems, the DRAMs 135 may be connected directly to the system bus 125 without using the buffer 144.)

FIG. 4 illustrates a similar timing sequence for a write access; however, prior to applying the column address bits and activating the CAS* signal, the WE* signal on the line 164 is activated, and the OE* signal on the line 166 is inactive. Thus, data are transferred from the system bus 125 through the buffer 144 to the DRAMs 135 and stored therein.

As illustrated in FIGS. 3 and 4, an access to the DRAMs 135 comprises a two-part operation wherein a row address is applied to the DRAMs 135 and is strobed into the DRAMs by activation of the RAS* signal. This causes the DRAMs to begin accessing a plurality of data storage locations which share the common row address. The data from the entire row are provided to an output multiplexer within each DRAM after a delay referred to as the row access time. The plurality of data bits accessed in a single row are said to be in columns within the row. Thereafter, when the column address is applied to the DRAMs 135 and the CAS* signal is activated, the column address selects one of the columns of data to be output from each of the DRAMs 135. Alternatively, in a write access, the data applied to the input of each of the DRAMs 135 are stored in the selected row at the column specified by the selected column address.

Figure 5:
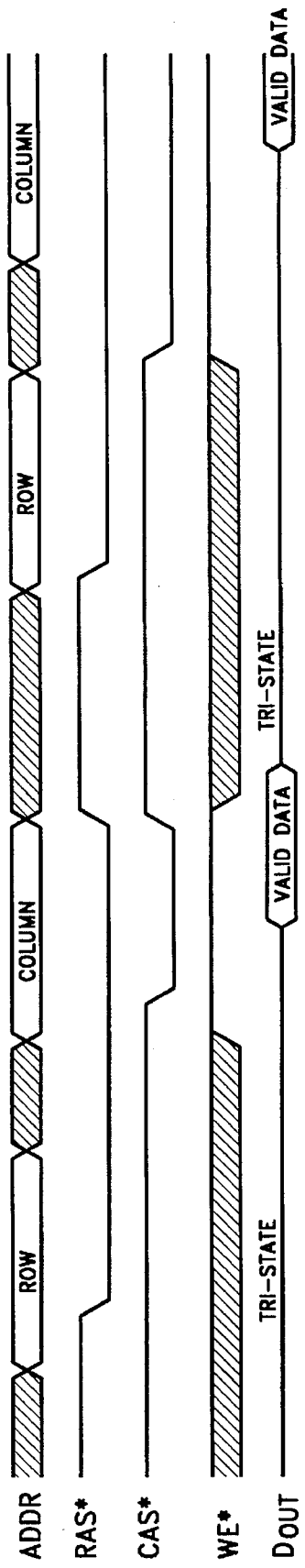
FIG. 5 illustrates the timing of successive write operations to different rows of a DRAM.

If a new address is to be applied to the DRAM, the RAS* signal must be deactivated for a sufficient time to allow the internal row addresses to precharge and the applied again with the new row address. The delay corresponding to the row access time is again incurred before the column address can be applied and the particular column of data selected for reading or writing. Thus, as illustrated in FIG. 5, a substantial time penalty is incurred each time a new row access is initiated.

Figure 6:
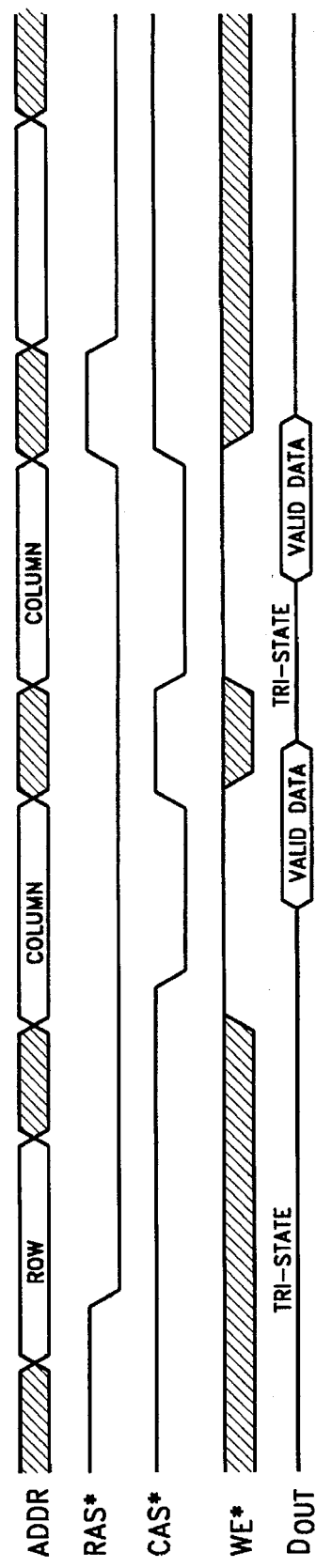
FIG. 6 illustrates the timing of successive write operations to the same row of a DRAM.

Most current DRAMs partially reduce the row access penalty by operating in the so-called page mode wherein sequential accesses to multiple columns in the same row of a DRAM can occur without further row accesses. In particular, as illustrated in FIG. 6, a number of accesses to the same row are initiated by applying a row address to the DRAMs and activating the RAS* signal. Thereafter, a first column address is applied to the DRAMs and the CAS* signal is activated. The RAS* signal is not deactivated after the first access. Instead, only the CAS* signal is deactivated, a new column address is applied, and the data from the new column is available or the data for the new column is stored only after the short column access time. Thus, when a sequence of accesses occur in the same row, a substantial time benefit is obtained.

As discussed above, the time savings provided by the page mode operation of a DRAM memory system cannot be obtained if the microprocessor 113 or other memory access device applies addresses in a non-sequential manner. For example, the microprocessor 113 may write data to an address corresponding to one particular row of the DRAMs 135 and then read data from or write data to an address corresponding to a different row of the DRAMs 135. In such cases, it is necessary to change the row address and incur the row access time penalty discussed above.

The time penalty may be more significant in a microprocessor-based system which permits posted writes to memory. As discussed above, in a system having posted writes, such as a system 180 illustrated in FIG. 7, the microprocessor 113 applies an address, write data and appropriate control signals to the system bus 125 to initiate a write access to the memory subsystem 120. Rather than wait for the completion of the write access, as indicated by the activation and subsequent deactivation of a busy signal from the memory subsystem 120, the microprocessor 113 continues issuing bus transactions. In order to accommodate posted writes, a memory controller 182 in the memory subsystem 180 includes a posted write buffer 184. The posted write buffer 184 stores the address and the data to be written to the DRAMs 135. In known posted write systems, the posted write buffer 184 may include storage for more than one posted write and operates as a first-in/first-out (FIFO) buffer. The memory controller 182 transfers the earliest posted write data to the DRAMs 135 by applying the address on the output of the posted write buffer 184 to the DRAMs as a row address portion and a column address portion as described above, with the difference that the address and data are provided by the posted write buffer 184 rather than directly from the system bus 125. The timing for storing write access request information into the FIFO buffer 184 and for applying the address and data outputs from the FIFO buffer 184 to the DRAMs 135 is provided by a timing generator and FIFO controller 186 via a control bus 187. The timing generator and FIFO controller 186 controls a row/column address multiplexer (MUX) 188 similar to that described above.

Generally, when the microprocessor 113 initiates a read access to the memory subsystem 120, the microprocessor 113 needs to have the responsive data before it continues with its next operation. Thus, exemplary posted write memory systems provide a read-around mode in which the memory controller 182 gives a read access request on the system bus 125 priority over pending posted writes. That is, if a read request is pending when a current access is completed, the read access is performed regardless of whether a posted write is pending, unless the read access request is directed to the same address location as a posted write. Because it is important that the read access retrieve the most current data, known posted write systems do one of two operations when a read request is directed to the same address as a posted write. The posted write buffer is flushed to write the write data to the DRAMs 135, or, alternatively, the read request is satisfied by outputting the requested data from the posted write buffer 184 in a similar manner to a cache memory subsystem. The read around mode is supported by a read/write address multiplexer (MUX) 190 which receives address information from the output of the posted write FIFO buffer 184 during write accesses and which receives address information directly from the system bus 125 during read accesses. A data output buffer 192 buffers the output data from the DRAMs 135 onto the system bus 125.

Conventional posted write systems retain the time penalty when sequential posted writes are directed to different rows of the DRAMs 135. In particular, when the memory controller 182 accesses the FIFO posted write buffer 184, it must change the row address whenever two sequential posted writes are directed to different rows in the DRAMs 135. Furthermore, when a read access occurs on a row different from the row of the current access, the row access time penalty is incurred. A conventional memory controller partially reduces the time penalty by detecting when sequential addresses are directed to the same page (i.e., row). As illustrated in FIG. 7, a row latch and comparator 194 is included which receives the row address portion of the output of the read/write address multiplexer 190. The row latch and comparator 194 latches the row address portion of a previous access on occurrence of an active RAS* signal. The latched row address portion is compared with the row address portion of the current access to determine whether the two row addresses are the same. If the two row addresses are the same, the row latch and comparator 194 provides an active signal to the timing generator and FIFO controller to cause it to keep the current page (i.e., row) open and to change only the column address by generating the CAS* signal for the new current access.

FIG. 8 illustrates a memory subsystem 200 in accordance with the present invention. In particular, the memory subsystem 200 comprises a memory controller 202 which incorporates an improved posted write buffer 204. The memory controller 202 further includes a timing generator and buffer controller 206 which will be described in more detail below. The timing generator and buffer controller 206 is connected to the posted write buffer 204 via a bidirectional control bus 208.

A read/write address multiplexer 210, a row/column address multiplexer 212 and a data output buffer 214 operate in a manner similar to the corresponding elements described above.

The memory controller 202 of FIG. 8 further includes a row address latch 220 which receives and latches the row address portion of the output of the read/write address multiplexer 210. The row address latch 220 is latched on occurrence of the active RAS* signal such that the row address portion of a current access is saved each time the row address is applied to the DRAMs. The latched output of the row address latch 220 is provided as an input to the timing generator and buffer controller 206.

Like the conventional posted write memory controllers, such as the one illustrated in FIG. 7, the timing generator in the posted write memory controller 202 of FIG. 8 keeps track of the row address of the current access via the row address latch 220. Unlike conventional memory controllers, the timing generator and buffer controller 206 includes comparison and pointer logic 230 which compares the row address portions of the currently open page (i.e., row) stored in the posted write buffer 204 and determines whether any of the active posted write requests has an address portion corresponding to the latched row address of the current access to the DRAMs 135. The comparison and pointer logic 230 further indicates the location within the posted write buffer 204 into which to store the address and data of incoming write requests via an input pointer and indicates the location from which to output the address and data of a posted write selected as the next access to the DRAMs 135 via an output pointer.

The timing generator and buffer controller 202 further receives the current address on the system bus 125, and, when the signal level on the read/write select line 152 indicates that the access request on the system bus 125 is a read access request, the comparison and pointer logic 230 within the timing generator and buffer controller 206 compares the row address portion of the requested read address with the latched row address to determine whether they are the same. The comparison and pointer logic 230 also compares the row address portion of the requested read address with the row address portions of the posted writes to determine whether the row address portions match. The results of the comparisons between the read address, the posted write addresses and the latched row address determine which access to the DRAMs 135 will be selected as the next access.

The selections of the next DRAM access are illustrated in a table 300 in FIG. 9 for a first preferred embodiment of the present invention. Each line of the table 300 has three columns wherein the first (left-most) column labeled "READ" is the result of the comparison of the row portion of the requested read access with the latched row address (i.e., the row portion of the current access); the second (middle) column labeled "WRITE" is the result of the comparison of the row portions of the posted writes with the latched row address and with the row portion of the requested read access; and the third (right-most) column labeled "ACCESS" identifies the request which will be applied to the DRAMs 135 as the next access.

As illustrated by the first row 301 of the table 300, when the requested read access does not match the current access, and the posted write buffer is empty, the read access will be applied to the DRAMs 135 as the next access, requiring the RAS* signal to be deactivated by the timing generator and buffer controller 206, and, after a predetermined delay to allow the row addresses to precharge, applying the row address portion of the read access request to the DRAMs, activating the RAS* signal and continuing the access as previously described. No particular speed advantage is provided for this access.

As illustrated in the second row 302, the third row 303 and the fourth row 304 of the table 300, when the requested read access does not match the current access, and the posted write buffer 204 is not empty, the access chosen as the next access depends upon the row contents of the posted writes in the posted write buffer 204. In particular, as illustrated in the fourth row 304, if one or more of the posted writes have row address portions corresponding to the current latched row address, then the earliest posted write having the corresponding row address portion may be selected as the next access with the benefit of not having to change the row address and only having to strobe in a new column address to perform the access. In particularly preferred embodiments, the timing generator and buffer controller 206 provides two modes of operation which are selectable via a programmable mode bit in a configuration register (not shown). In a first mode described herein, posted writes having the same row address portion as the current latched row address have priority over reads which have a different row address portion. In a second mode, read accesses are always given priority over posted writes. Depending upon the mix of addresses, different applications will set the mode bit to select either the first mode/or the second mode in accordance with which mode provides the optimal overall execution time for a particular application. Empirical runtime tests can be performed on various applications to determine which mode is preferable for particular applications.

If no posted write has a row address portion matching the current latched row address, then the row address portion of the requested read access is compared to the row address portion of all the posted writes. If the row address portion of the requested read access is different from the row address portions of all the posted writes as indicated by the entry "NEW (DIF)" in the second row 302 of the table 300, then the read access is selected as the next access. On the other hand, if the row address portion of the requested read access does match the row address portion of one or more posted writes, then the earliest posted write is applied as the next access. This decision is made in order to assure that a read access to a recently written data location which may still be posted in the posted write buffer 204 receives the correct data. As discussed above, the timing generator and buffer controller 204 may include logic (not shown) which supplies data posted in the posted write buffer 204 as output data when the read request is directed to a location having a posted write currently stored in the posted write buffer 204.

As illustrated in the fifth line 305 and in the sixth line 306 of the table 300, when the row address portion of the read access request matches the latched row address portion, the read access will be performed as the next access when the posted write buffer 204 is empty (line 305) or the posted write buffer 204 only contains posted writes to locations having row address portions different from the current latched row address portion. Thus, the speed advantage of not having to change the row address between accesses is obtained.

As illustrated in the seventh line 307 of the table 300, when the row address portion of the requested read access and the row address portion of one or more posted writes matches the current latched row address portion, then the earliest matching posted writes is selected as the next access.

The foregoing process is repeated at the end of each current access to determine which of the requested read access and posted writes will be selected as the next access. It should be understood that the timing generator and write buffer controller 206 includes logic to determine when the posted write buffer 204 is full such that one or more of the posted writes may be selected as the next access to the DRAMs 135 regardless of the results of the comparisons of the row address portion of the read access and the current latched row address portion.

It can be seen from the foregoing description that the embodiment represented by the table 301 has a residual read latency when the row address portion of the requested read access and the row address portion of one or more posted writes match. However, although the read access may be to the same DRAM row, there is a substantial probability that the read access may be to a different column within the row. In such a case, it is not necessary to store the posted write data in one column prior to reading data from the different column. Thus, if the comparison between the read access address and the posted write addresses is extended to the column address portion, a number of conflicts can be avoided such that the read access can be completed prior to the posted writes. For example, by comparing one bit of the column address portion of the requested read access and the posted writes, the probability of a conflict within the same row can be reduced to approximately 50%. Each additional bit compared further reduces the probability of conflict; however, a comparator must be provided for each additional bit for each of the posted writes. A tradeoff can be made between the additional logic required for the comparisons and the probable reduction in read latency provided by each additional bit.

A table 310 in FIG. 10 illustrates the alternative selections for the next DRAM access when the comparison of the read request to the posted writes is extended into the column address portion as just discussed. The table 310 is similar to the table 300 with row 311 of the table 310 corresponding to the row 301 of the table 300 and so forth; however, the operation of the alternative embodiment with respect to the row 312, the row 313 and the row 317 are different, and a new row 318 has been added.

In the second column of the row 312 and the row 313, the entries "NEW (DIF)" and "NEW (SAME)" now refer to the extended comparison wherein the row address portion of the requested read access and the row address portion of each posted write are compared as before; however, a selected bit or bits of the column address portions of the requested read access and the posted writes are also compared. Thus, a posted write to a new row address will be selected over a requested read access to a new row address only if the row address and the selected bit or bits of the column address are the same. Otherwise, the requested read access will be selected as the next access.

In the row 317 and the row 318, when the requested read access and one or more posted writes have row address portions which match the latched row address portion, the selection of which access to apply as the next access is determined by further comparison of the selected column bit or bits. As illustrated in the row 317, if the row address portions are the same and the selected column bit or bits are different, then the read access is selected as the next access in the same DRAM row as the current access, thus reducing the read latency time. On the other hand, as illustrated in the row 318, if the row address portions are the same and the selected bit or bits of the column address portions are also the same, then the earliest posted write having the same row address portion and the same selected bit or bits of the column address portion is applied as the next access to the DRAMs 135.

The tables 300 and 310 illustrate the selections between read accesses and write accesses. A table 320 in FIG. 11 illustrates further detail of selections between posted write accesses in accordance with whether any of the posted writes are directed to the same row as the current access. The table 320 comprises four entry rows 321, 322, 323 and 324. A first column in each of the rows 321–324 indicates whether the posted write buffer includes at least one posted write access directed to the same row as the row address portion of the current access (e.g., a page hit). A second column in each of the rows 321–324 indicates whether the posted write buffer 204 includes at least one posted write access directed to a row different from the row address portion of the current access (e.g., a page miss). A third column indicates which write access is selected as the next write access from the posted write buffer 204.

As illustrated in the first row 321, when no posted writes to either the current row or to a new row are present, no write access will be performed. As illustrated in the second row 322, when posted writes to one or more new rows (e.g., page misses) are present but no posted writes are present for the current row, then the next write access will be performed to a new row and the oldest posted write will be selected for the next write access. As illustrated in the third row 323, when at least one posted write to the current row (e.g. a page hit) is present, then the next write access will be performed to the current row and the oldest posted write to the current row will be selected for the next access. As further illustrated in the fourth row 324, even if a posted write to a new row is present which is older than the posted writes to the current row, the posted writes to the current row will be given priority and the next write access will be performed to the current row. The oldest posted write to the current row will be selected for the next write access.

Implementation of the embodiments of FIGS. 8–11 require a non-conventional posted write buffer 204 because the posted writes are not necessarily output from the buffer in the same order in which they are stored in the buffer. Thus, a conventional first-in/first-out (FIFO) buffer cannot be used. Keeping track of the locations of the active posted writes when the posted writes can be removed out of order and comparing the row address portions and selected bits of the column address portions is performed by the comparison and pointer logic 230 within the timing generator and buffer controller 206. The comparison and pointer logic 230 is illustrated in more detail in FIGS. 12–16.

Figure 12:
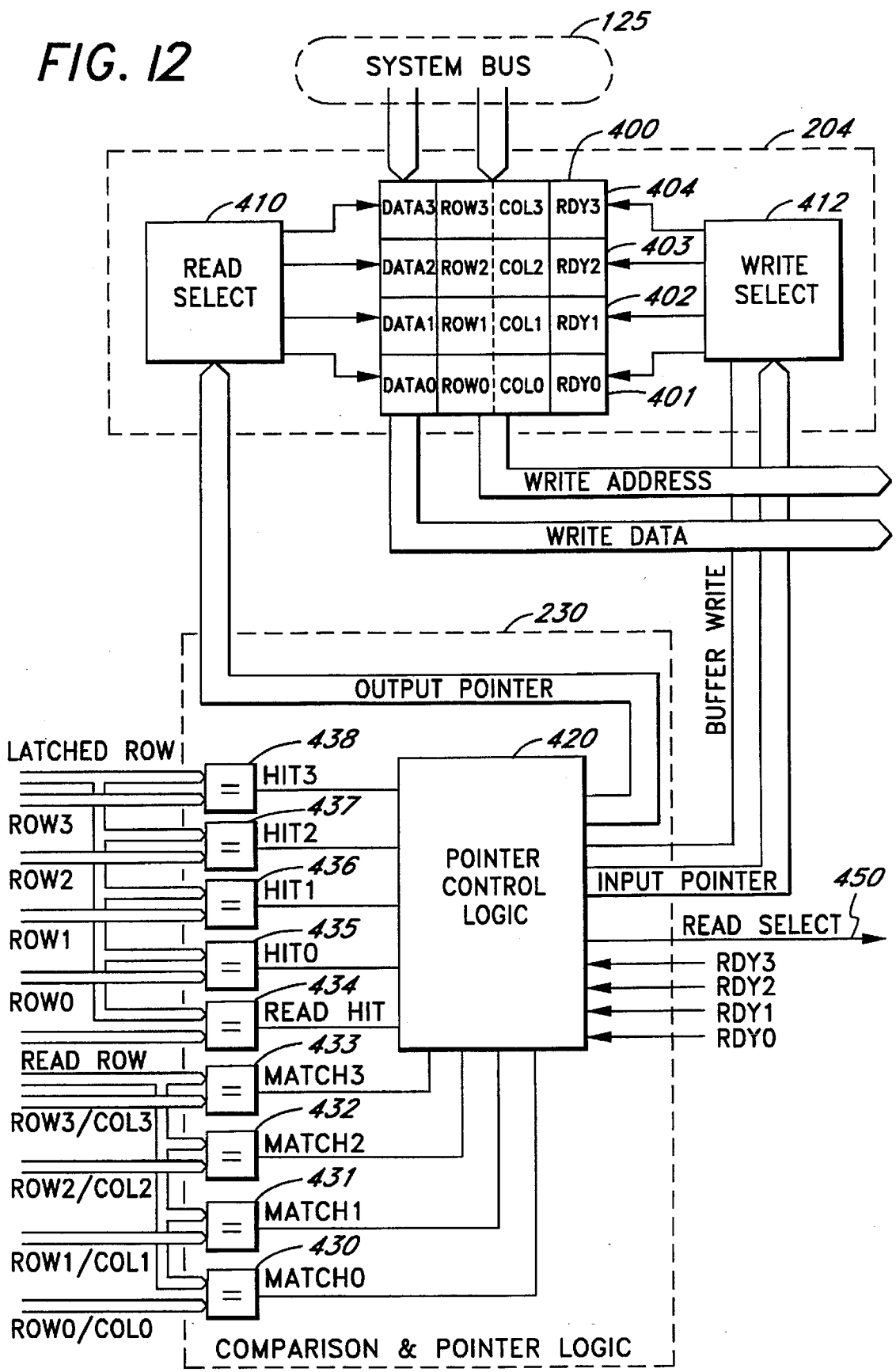
FIG. 12 illustrates a more detailed block diagram of the comparison and pointer logic of FIG. 8.

FIG. 12 illustrates an overall block diagram of the comparison and pointer control logic 230 and also illustrates additional detail of the posted write buffer 204. The posted write buffer 204 comprises a buffer array 400 which comprises a plurality of buffer locations, which, in the preferred embodiment, comprises four locations 401–404. Each of the buffer locations 401–404 provides storage for a plurality of data bits (e.g., 32 bits), a plurality of address bits (e.g., addresses AD2–AD21), and a ready (RDY) bit. The posted write buffer 204 is preferably a dual-port buffer which provides independent addressing capabilities for data writes and data reads. In addition, the data within the write buffer 204 are provided as output data directly to the comparison and pointer control logic 230, as described below. For example, the posted write buffer 204 illustrated in FIG. 12 includes a read select circuit 410 responsive to an output pointer from the comparison and pointer control logic 230 to select the data in one of the buffer locations 401–404 as the output data from the posted write buffer 204. The read select circuit 410 is advantageously a 1-to-4 decoder, for example. Alternatively, the output pointer may be used to address an output multiplexer (not shown).

The posted write buffer 204 also includes a write select circuit 412 which generates a write signal to a selected one of the buffer locations 401–404 in response to an input pointer and a buffer write signal from the comparison and pointer control logic 230. When the buffer write signal is activated, write select circuit 412 decodes the input point and writes the data and address information and the ready signal on the input to the buffer array 400 to the decoded buffer location 401–404.

As illustrated in FIG. 12, the address portion of each buffer location 401–404 is further apportioned as a row portion (e.g., ROW0, ROW1, ROW2, ROW3, respectively) and a column portion (e.g., COL0, COL1, COL2, COL3, respectively). The respective ready bits are similarly identified (e.g., RDY0, RDY1, RDY2, RDY3, respectively).

The comparison and pointer control logic 230 comprises a pointer control logic portion 420 and a plurality of comparators 430–438. The comparators 430–433 are read comparators which compare the row address portion and selected bits of the column address portion of the read request on the system bus 125 with the address portions and selected bits of the column portion of each of the posted writes in the buffer array 400. For example, the comparator 430 compares the row address portion and selected column address portion of the read request with ROW0 and selected bits of COL0 from the buffer location 401. The output of the comparator 430 is a match signal (MATCH0) which indicates that the read request is directed to the same row address and possibly the same column address as the posted write stored in the buffer location 401. (If the comparator 430 is expanded to encompass all the column bits, then the comparator 430 can determine an exact match.) In like manner, the comparators 431, 432 and 433 provide respective MATCH1, MATCH2 and MATCH3 outputs to indicate matches between the posted writes in the locations 402, 403 and 404, respectively.

The comparator 434 receives the row address portion of the current read request and the latched row address from the row address latch 220 (FIG. 8). The comparator 434 outputs an active READ HIT signal when the two row address portions are identical to indicate that the read access request is directed to the currently open memory page (i.e., the currently accessed row of the DRAMs 135).

The comparator 435 receives the row address portion (ROW0) from the buffer location 401 and the latched row address portion from the row address latch 220. The comparator 435 provides an active HIT0 output when the two row address portions are the same. Similarly, the comparators 436–438 provide respective HIT1, HIT2 and HIT3 outputs in response to a comparison between the latched row address and the ROW1, ROW2 and ROW3 signals, respectively. In alternative embodiments, the MATCH and HIT comparators can be time multiplexed to reduce the total amount of hardware required.

The MATCH0, MATCH1, MATCH2, MATCH3, READ HIT, HIT0, HIT1, HIT2 and HIT3 signals are provided as inputs to the pointer control logic 420 along with the RDY0, RDY1, RDY2 and RDY3 signals. The ready signals are combined with the match signals and the hit signals so that the pointer control logic 420 is responsive only to hits and matches to posted writes which have not yet been written to the DRAMs 135. Thus, after storing the data associated with a posted write, only the respective ready signal need be cleared to disable the respective hit and match signals.

The pointer control logic generates a read select output signal on a line 450 to control the read/write address multiplexer 210. The read select output signal is activated when a read hit occurs and the read access is selected in accordance with the table 310 in FIG. 10, as described above. The detailed logic diagrams or logic equations for generating the read select output signal based upon the table 310 will not be described herein as the generation of such logic diagrams or logic equations is well within the purview of a person skilled in the art.

As discussed above, in order to reduce the latency of the memory subsystem 120 of the present invention, it is necessary to have the capability of transferring data from the posted write buffer 204 to the DRAMs 135 in an order different than the order in which the data are received from the system bus 125. Thus, a conventional FIFO buffer cannot be used. Furthermore, by transferring data out of order, "holes" are left in the posted write buffer 204 which must be taken into consideration when selecting the next posted write to transfer to the DRAMs 135. Finally, as discussed above, when two or more posted writes are directed to the same memory row, it is necessary to transfer the data in the order in which they are received in order to make sure that later data directed to the same column overwrites earlier data and not vice versa.

FIG. 13 illustrates a high level functional representation of the posted write buffer 204 to aid in understanding how the pointer control logic 430 of FIG. 12 operates. The buffer 204 is a four-entry queue; however, a larger queue (i.e., buffer) can readily be implemented in accordance with the present invention. The queue 204 is similar to a FIFO in some respects; however, the queue 204 allows entries to be inserted and removed in any order, not just from the ends of the queue. The queue 204 utilizes pointers to fixed entry positions within the array in a manner similar to that of a standard FIFO; however, unlike a standard FIFO, the queue 204 does not utilize a fill count to keep track of which entry is available for storage. Instead, an entry-ready bit is provided for each storage location (referred to as the RDY bits in FIG. 13).

Pointers into the queue structure and the respective entry-ready bits for each position define the state of the queue. A pointer is pointing to a particular position if the pointer holds the respective position number shown to the left of each position in FIG. 13. In FIG. 13, entry positions 1 and 2 are shown as having queued entries (i.e., posted writes which have not been transferred to the DRAMs 135) and positions 0 and 3 are shown as being empty (i.e., any posted writes previously in those positions have already been transferred to the DRAMs). Thus, the entry-ready bits are set (i.e., have a value of 1) for positions 1 and 2 and are cleared (i.e., have a value of 0) for positions 0 and 3).

An input pointer points to the next available empty slot in the queue. The entry pointer is valid if the corresponding entry ready bit is not set (i.e., 0). Otherwise, if the entry ready bit is set (i.e., 1), the input pointer is invalid because the position is already occupied.

An output pointer points to the queue entry current being processed or about to be processed. The output pointer is valid if the entry ready bit at the corresponding position is set (i.e., 1) and is invalid if the entry ready bit is not set.

The base entry pointer generally points to the oldest unprocessed entry in within the queue structure. The base entry pointer is not used to directly access the queue structure, but is used to generate the input pointer and the output pointer, as described below.

The pointers described herein are two-bit pointers encode the four positions of the queue. If additional queue positions are provided, additional bits will also be needed in the pointers.

When the queue 204 is empty, all the entry ready bits are inactive, and the input pointer, the output pointer and the base entry pointer all point to the same position in the queue.

When the queue 204 is processing entries in the order in which they are received, the queue functions like a conventional, pointer-based FIFO with the base entry pointer and the output pointer always pointing to the same location. In other words, the next posted write to transfer to the DRAMs 135 will be the oldest entry indicated by the base entry pointer. A new entry can be placed in the queue if the input pointer is pointing to a location which has an inactive entry ready bit. If the input pointer has progressed such that it points to the same position as the base entry pointer, no further entries can be accepted. Each time a new entry is stored in the queue, the entry ready bit of the position where the entry is stored is set and the input pointer is moved to the next higher storage position number. The pointers count modulo-4 such that when a pointer is incremented from a value of 3 (i.e., binary 11), the next value will be 0 (i.e., binary 00). In other words, the pointer wraps around from 3 to 0.

Entries are removed from the queue at the position indicated by the output pointer. After an entry is removed, the entry ready bit is reset, and the base entry pointer and the output pointer are both incremented, wrapping to 0 if the removed entry was in location 3.

When an entry is removed from the queue in an order different from the input order, holes are formed in the queue. The entry ready bits define where the holes are. The queue is initialized by setting all the entry ready bits to an inactive state. The entry ready bits are accessed as an array (entry ready array) with the bit number within the array being the same as the position number of an entry in the queue structure. Queue entries can be added or removed from the queue by setting or clearing the respective entry ready bits.

In order to allow the entries to be removed from the queue in a different order than they are stored, the output pointer is allowed to move independently from the base entry pointer. The position number indicated by the output pointer is selected based upon a priority scheduling function defined for the queue. The priority scheduling function is selected for the particular application for which the queue is intended. The priority scheduling function of the output pointer for the present invention will be described herein.

The pointer control logic 230 is a state machine which determines the next state of the queue 204 (i.e., the next input pointer, the next output pointer and the next base pointer). The next state of the queue 204 is a function of the current base entry pointer and the current entry ready bits, and is also a function of the priority scheduling hardware, which, in the case of the present invention, includes the outputs of the hit comparators.

Figure 14:
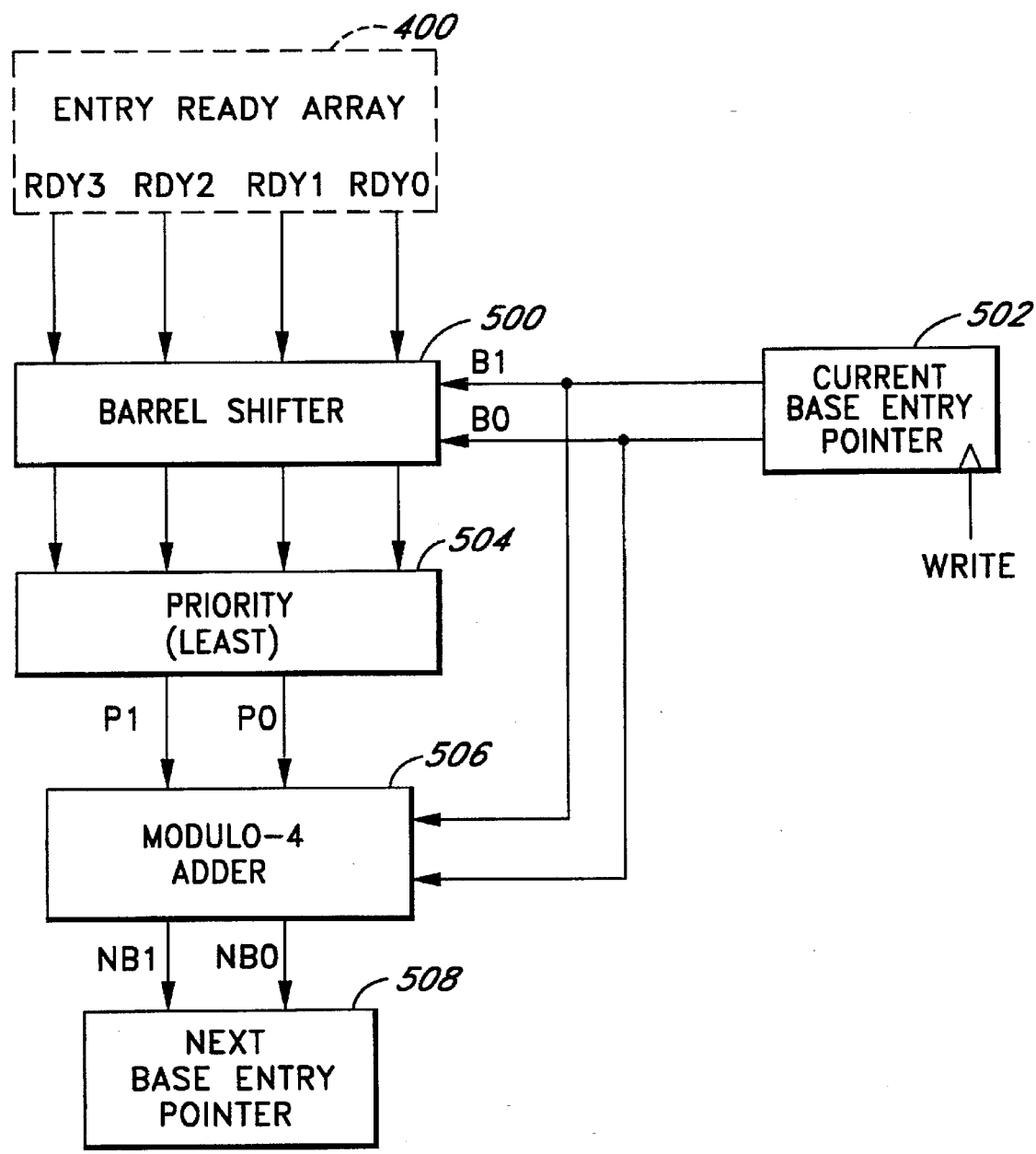
FIG. 14 illustrates the functional logic of the pointer control logic of FIG. 12 which generates the base entry pointer.

The base entry pointer will change only when the output pointer points to the same position as the base entry pointer and the entry at that position is removed by transferring the data to the DRAMs 135. If the entry at the next queue position has already been removed, logic is required to jump over that "hole." In particular, as illustrated in FIG. 14, the entry ready array (RDY3, RDY2, RDY1, RDY0) from the buffer array 400) is applied to the inputs of a four-bit barrel shifter 500 which is controlled by the two-bit value (B1, B0) of the current base entry pointer 502. The inputs to the barrel shifter are circularly shifted right (i.e., rotated right) by an amount equal to the value of the current base entry pointer. For example, if the current base entry pointer has a value of 2, the entry ready array will shift to the right two places, with the two least significant bits of the inputs to the barrel shifter 500 becoming the two most significant bits of the output of the barrel shifter 502. A priority encoder 504 selects the bit number of the first active entry ready bit found in the rotated output. This bit number is then added to the current base entry pointer in a modulo-4 adder 506 to obtain the next base entry pointer 508. The next base pointer becomes the current base pointer when the next data are written out to the DRAMs 135 is illustrated by the write signal clocking the current base entry pointer.

The foregoing can be understood by the following example in which the current base entry pointer is equal to 1 and the entry ready array is equal to 1011 (i.e., RDY3=1, RDY2=0, RDY1=1 and RDY0=1). Thus, entries exist in positions 3, 1 and 0 and a hole exists at position 2. Removing the entry at position 1, changes the entry ready array to 1001. When right rotated one bit (the value of the current base entry pointer), the output of the barrel shifter 500 is 1100. The first active entry from the right is bit 2. Adding 2 to 1 (modulo-4) results in a value of 3 for the new base entry pointer, thus skipping over the hole.

Figure 15:
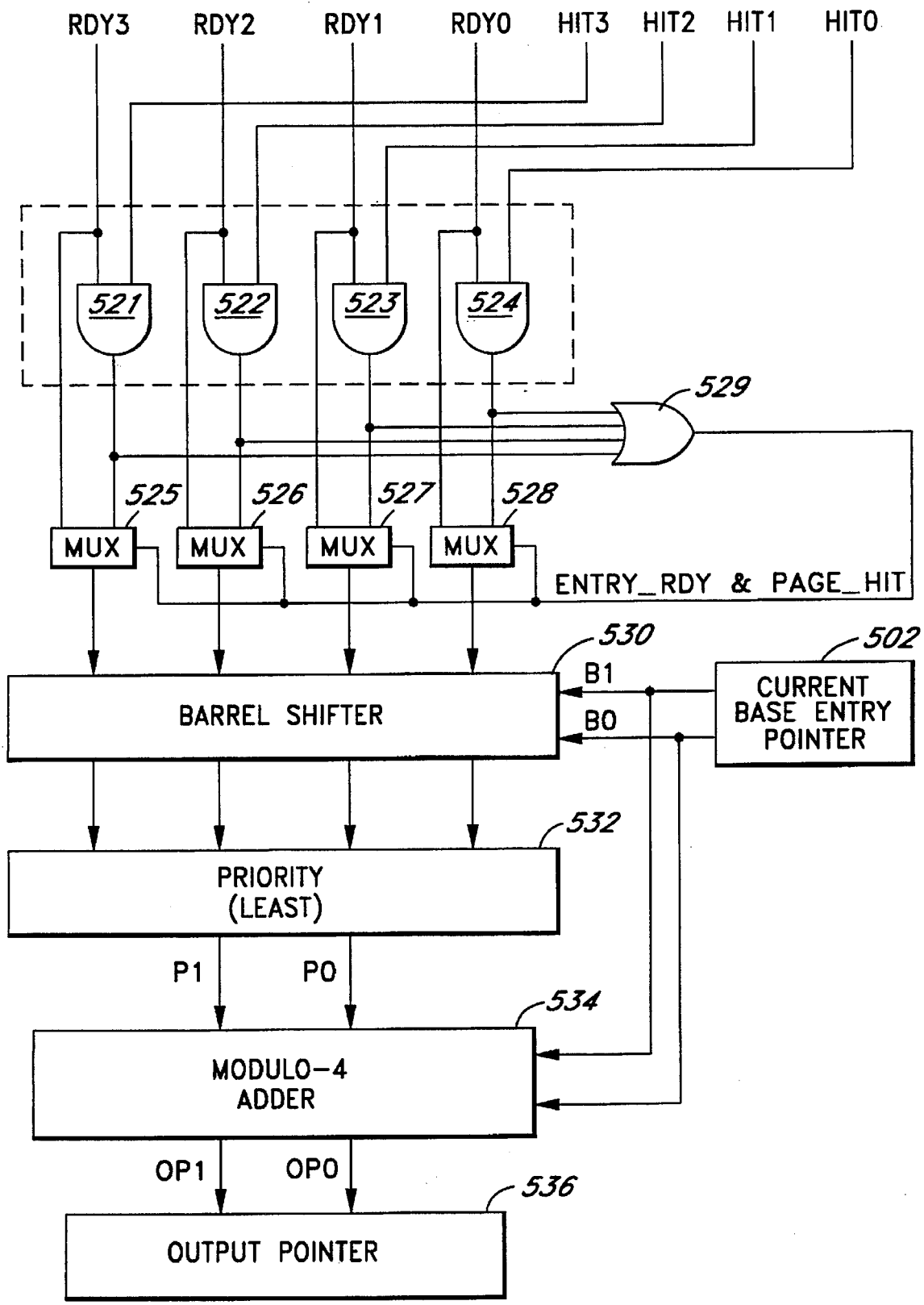
FIG. 15 illustrates the functional logic of the pointer control logic of FIG. 12 which generates the output pointer.

As illustrated in FIG. 15, one or more priority scheduling functions may be used to screen the entry ready array for the next task to process. The output pointer is formed by AND'ing the entry ready array with a priority screen mask comprising, in the present invention, the hit bits (HIT3, HIT2, HIT1, HIT0 from the comparators 435–438 in FIG. 12) in a plurality of AND gates 521–524, as illustrated in FIG. 15. The masked outputs of the AND gates 521–524 are provided as respective first inputs to corresponding two-to-one (2:1) multiplexers (MUXes) 525–528. The respective second inputs to the 2:1 multiplexers 525–528 are connected to receive the ready bits (RDY3, RDY2, RDY1, RDY0), respectively. The masked outputs of the AND gates 521–524 are also provided as inputs to a four-input OR gate 529 which provides an active ENTRY_RDY & PAGE_HIT output whenever one or more of the masked outputs of the AND gates 521–524 are active. In other words, the OR gate 529 will provide an active ENTRY_RDY & PAGE_HIT output whenever at least one of the active posted write entries is directed to the currently accessed row as indicated by its ready bit and its corresponding hit bit both being active. The ENTRY_RDY-&-PAGE_HIT output of the OR gate 529 is provided as the select input to each of the 2:1 multiplexers 525–528. When the select input is active, the masked outputs of the AND gates 521–524 are selected as the outputs of the multiplexers. Thus, only the multiplexers corresponding to entries having both an active entry bit and an active hit bit will have an active output. Therefore, the generation of the output pointer, described below, will be based only upon entries having page (i.e., row) hits and the oldest active entry with a page hit will be selected. On the other hand, if none of the active entries has an active hit bit, then the output of the OR gate 529 will be inactive to cause the 2:1 multiplexers 525–528 to select the unmasked ready bits. Thus, the output pointer will be generated based upon all the active entries and the oldest active entry will be selected.

The outputs of the 2:1 multiplexers 525–528 are provided as the inputs to a barrel shifter 530. The barrel shifter 530 operates in a similar manner to the barrel shifter 500 in FIG. 14 in response to the current base entry pointer. The shifted outputs from the barrel shifter 530 are provided as inputs to a priority encoder 532 which selects the bit number of the first entry ready bit from the right of the rotated output. This bit number is added to the base entry pointer in a modulo-4 adder 534 to generate the new output pointer (illustrated as a block 536).

The foregoing can be illustrated by the following example in which the base entry pointer is 3, the entry ready array is 1101 and the priority screen mask (i.e., the hit bits) are 0111 to indicate that only the row address portions in the positions 2, 1 and 0 match the latched row address portion and thus have a higher priority than the entry in the position 3 which does not match the current row address portion. And'ing the entry ready bits with the hit bits (i.e., 1101 AND 0111) results in an input 0101 to the barrel shifter. Rotating the input of the barrel shifter by 3 results in a barrel shifter output of 1010. The bit number of the first active bit from the right is 1. Adding this bit to the base entry pointer (modulo-4) results in a value of 0 (1+3=4(modulo-4)=0). Thus, for this example the new output pointer is 0 to point to the location of the "oldest" posted write having the same row address portion as the current latched row address, thereby skipping over an older posted write which does not have the same row address portion as the current latched row address.

It should be understood that if there are no page hits, the foregoing process operates in the same manner except that all active entries are provided as inputs to the barrel shifter via the multiplexers 525–528, and the output pointer will thus point to the oldest posted write irrespective of its row address.

Figure 16:
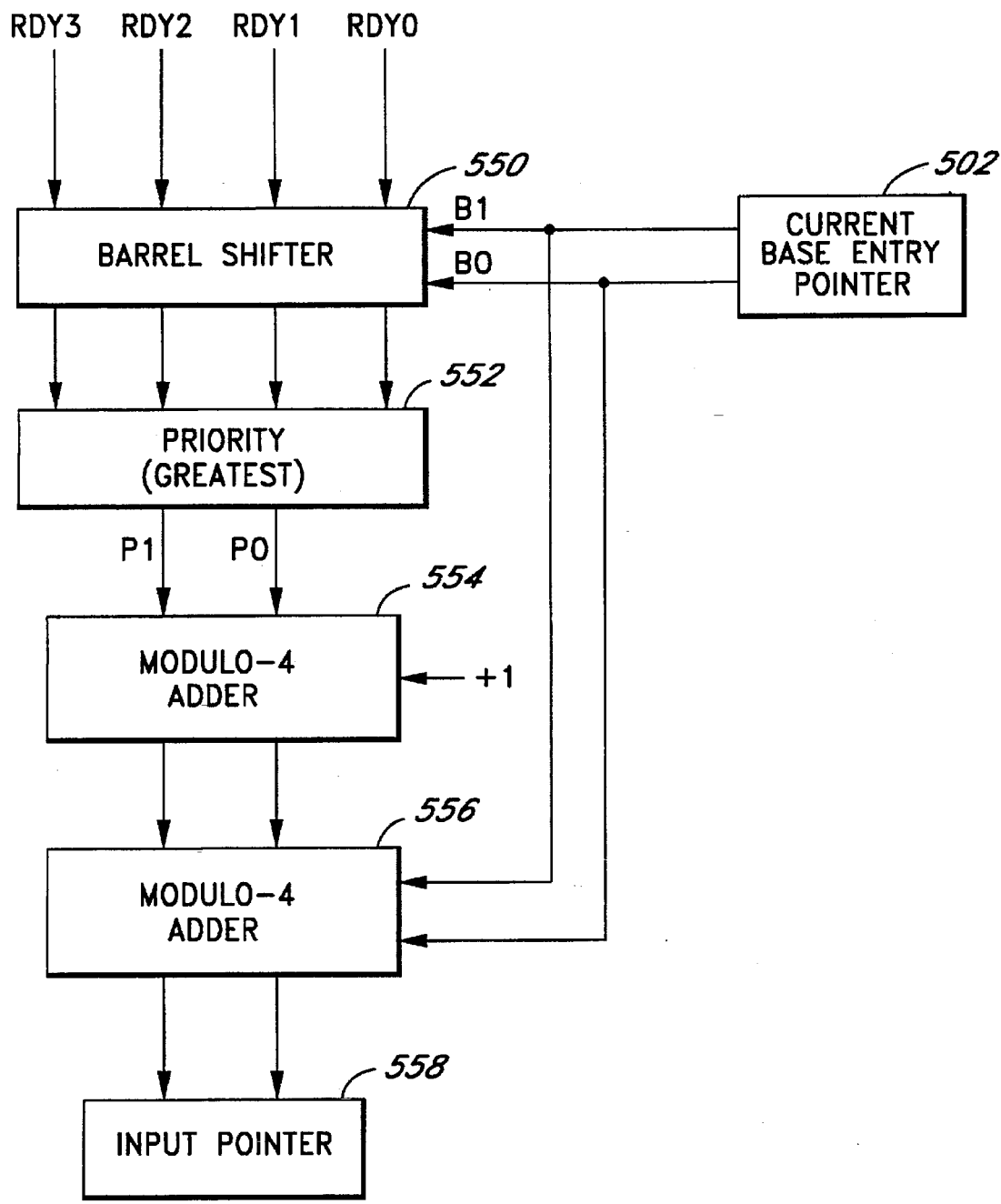
FIG. 16 illustrates the functional logic of the pointer control logic of FIG. 12 which generates the input pointer.

As illustrated in FIG. 16, the next input pointer is formed by right rotating the entry ready array by the value of the base entry pointer in a barrel shifter 550. The right shifted outputs are applied as the inputs to a priority encoder 552 which, in this particular case, selects the left-most (i.e., highest priority) active bit and generates an output value representing the position of the selected bit. The output of the priority encoder 552 is added to a value of 1 in a modulo-4 adder 554, and the resulting sum is added to the value of the current base entry pointer in a modulo-4 adder 556. The output of the modulo-4 adder 556 is the new input pointer, as illustrated by a block 558.

The foregoing can be illustrated by the following example in which the base entry pointer is 1 and the entry ready array is 1010. Right rotating the entry ready array by one generates an output of 0101 from the barrel shifter 550. The priority encoder 552 generates an output of 2 to represent the left-most active bit in position 2. Adding the value of 2 to a value of 1 generates a sum of 3, which, when added to the value of the base entry pointer (i.e., 1 in this example), generates a sum of 4(modulo-4), which generates a final value of 0. Thus, the next input entry will be placed in position 0, skipping over the hole in position 2.

The queue control logic described in connection with FIGS. 14, 15 and 16 are preferably implemented in an ASIC to form the structure of the pointer control logic 420 of FIG. 12.

Although described above in connection with the present invention for a posted write buffer, it should be understood that the queue control logic described herein can be used in other applications.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A buffer circuit which permits write access data to be received in a sequential order and stored in a plurality of locations in said buffer circuit and which permits said write access data to be output from said buffer circuit non-sequentially, wherein said write access data includes addresses which identify storage locations in a paged memory system, said buffer circuit comprising:

an input pointer which identifies a next empty one of said buffer circuit locations to receive a next data input;

an output pointer which identifies a next full one of said buffer circuit locations as a source of a next output; and a pointer control circuit which controls said input pointer and said output pointer independently, said pointer control circuit including a priority scheduler responsive to a result of a comparison as to whether page address portions of said addresses of said write access data are identical to a page address portion of a currently accessed storage location in said paged memory system, to select a full one of a plurality of full ones of said buffer circuit locations as said source of said next output, before selecting a non-identified full one of said buffer circuit locations having a page address portion different from said page address portion of said currently accessed storage location, even if the write access data for said non-identified full one of said buffer circuit locations was received in said buffer circuit prior to the write access data for said selected full one of said buffer circuit locations.

2. The buffer circuit as defined in claim 1, wherein said paged memory system is a dynamic random access memory (DRAM) having a plurality of rows, each row being a page of said DRAM.

* * * * *